(12) United States Patent
Zhang et al.

(10) Patent No.: US 12,277,689 B2
(45) Date of Patent: Apr. 15, 2025

(54) VIDEO PROCESSING METHOD, ELECTRONIC DEVICE, AND STORAGE MEDIUM

(71) Applicant: Lemon Inc., Grand Cayman (KY)

(72) Inventors: Jingcong Zhang, Los Angeles, CA (US); Nathanael Schager, Los Angeles, CA (US); Xiaocheng Tang, Los Angeles, CA (US); James Gualtieri, Los Angeles, CA (US); Yang Lv, Beijing (CN); Zhe Huang, Los Angeles, CA (US); Zeyong Cai, Los Angeles, CA (US); Jing Wang, Beijing (CN); Xiaoyu Liu, Los Angeles, CA (US); Nite Luo, Los Angeles, CA (US); Julia Meng, Culver City, CA (US); Haiying Cheng, Culver City, CA (US); Qinzi Tan, Beijing (CN)

(73) Assignee: LEMON INC., Grand Cayman (KY)

(*) Notice: Subject to any disclaimer, the term of this patent is extended or adjusted under 35 U.S.C. 154(b) by 106 days.

(21) Appl. No.: 18/056,155

(22) Filed: Nov. 16, 2022

(65) Prior Publication Data

US 2023/0237625 A1 Jul. 27, 2023

(30) Foreign Application Priority Data

Jan. 24, 2022 (CN) .......................... 202210077967.4

(51) Int. Cl.
  *G06T 5/77* (2024.01)
  *G06T 7/40* (2017.01)

(52) U.S. Cl.
  CPC .................. *G06T 5/77* (2024.01); *G06T 7/40* (2013.01); *G06T 2207/10016* (2013.01); *G06T 2207/30201* (2013.01)

(58) Field of Classification Search
  CPC ... G06T 5/77; G06T 7/40; G06T 2207/10016; G06T 2207/30201
  See application file for complete search history.

(56) References Cited

U.S. PATENT DOCUMENTS

| | | | | |
|---|---|---|---|---|
| 2020/0058153 A1* | 2/2020 | Ouyang | ............... | G06V 20/647 |
| 2020/0234481 A1* | 7/2020 | Scapel | ................. | A63F 13/213 |
| 2022/0237869 A1* | 7/2022 | Takeda | ..................... | G06N 3/08 |

OTHER PUBLICATIONS

Cao_CN110796083_translated—EPO (Year: 2020).*

* cited by examiner

*Primary Examiner* — Sing-Wai Wu
(74) *Attorney, Agent, or Firm* — Astute IP Law Group

(57) ABSTRACT

Provided are a video processing method and apparatus, an electronic device, a storage medium and a program product. The method includes steps described below. A to-be-processed video is acquired, and a first face key point of a first target object in the to-be-processed video is recognized, where the first face key point corresponds to a mask key point in a three-dimensional human face mask effect; and the three-dimensional human face mask effect is added to video frames of the to-be-processed video to obtain a target video, where the mask key point in the three-dimensional human face mask effect moves with the corresponding first face key point.

17 Claims, 4 Drawing Sheets

---

Acquire a to-be-processed video, and recognize a first face key point of a first target object in the to-be-processed video, where the first face key point corresponds to a mask key point in a three-dimensional human face mask effect — S101

Add the three-dimensional human face mask effect to video frames of the to-be-processed video to obtain a target video, where the mask key point in the three-dimensional human face mask effect moves with the corresponding first face key point — S102

VIDEO PROCESSING METHOD, ELECTRONIC DEVICE, AND STORAGE MEDIUM

CROSS-REFERENCE TO RELATED APPLICATION

This application claims priority to Chinese Patent Application No. CN202210077967.4, filed on Jan. 24, 2022, the disclosure of which is incorporated herein by reference in its entirety.

TECHNICAL FIELD

Embodiments of the present disclosure relate to the field of computer technology, in particular, a video processing method and apparatus, an electronic device, a storage medium and a program product.

BACKGROUND

At present, face effects may be added to a video. However, the existing face effects can generally move as a whole according to the movement of a human face in a video, and thus the manner of presentation is relatively single, resulting in poor user experience.

SUMMARY

Embodiments of the present disclosure provides a video processing method and apparatus, an electronic device, a storage medium and a program product, so as to enrich manners for presenting face effects.

In a first aspect, the embodiments of the present disclosure provide a video processing method. The method includes steps described below.

A to-be-processed video is acquired, and a first face key point of a first target object in the to-be-processed video is recognized, where the first face key point corresponds to a mask key point in a three-dimensional human face mask effect.

The three-dimensional human face mask effect is added to video frames of the to-be-processed video to obtain a target video, where the mask key point in the three-dimensional human face mask effect moves with the corresponding first face key point.

In a second aspect, the embodiments of the present disclosure further provide a video processing apparatus. The apparatus includes a video acquisition module and an effect adding module.

The video acquisition module is configured to acquire a to-be-processed video, and recognize a first face key point of a first target object in the to-be-processed video, where the first face key point corresponds to a mask key point in a three-dimensional human face mask effect.

The effect adding module is configured to add the three-dimensional human face mask effect to video frames of the to-be-processed video to obtain a target video, where the mask key point in the three-dimensional human face mask effect moves with the corresponding first face key point.

In a third aspect, the embodiments of the present disclosure further provide an electronic device. The electronic device includes one or more processors and a memory configured to store one or more programs.

The one or more programs, when executed by the one or more processors, cause the one or more processors to implement the video processing method according to the embodiments of the present disclosure.

In a fourth aspect, the embodiments of the present disclosure further provide a computer-readable storage medium storing a computer program which, when executed by a processor, implements the video processing method according to the embodiments of the present disclosure.

In a fifth aspect, the embodiments of the present disclosure further provide a computer program product which, when executed by a computer, causes the computer to implement the video processing method according to the embodiments of the present disclosure.

According to the video processing method and apparatus, the electronic device, the storage medium and the program product provided in the embodiments of the present disclosure, the to-be-processed video is acquired, and the first face key point of the first target object in the to-be-processed video is recognized, where the first face key point corresponds to the mask key point in the three-dimensional human face mask effect; and the three-dimensional human face mask effect is added to the video frames of the to-be-processed video to obtain the target video, where the mask key point in the three-dimensional human face mask effect moves with the corresponding first face key point. According to the preceding technical solution used in the embodiments, the three-dimensional human face mask special effect presenting the same face action as a person in the video can be added to the video, so that the visual effect and interest of the video are improved. Moreover, when the preceding technical solution is applied to an effect creation tool, a designer can directly view the preview effect of the effect, which is convenient for the creation of the designer.

BRIEF DESCRIPTION OF DRAWINGS

The above and other features, advantages and aspects of embodiments of the present disclosure become more apparent with reference to the embodiments described below in conjunction with drawings. The same or similar reference numerals throughout the drawings denote the same or similar elements. It is to be understood that the drawings are illustrative and that originals and elements are not necessarily drawn to scale.

DETAILED DESCRIPTION

Figure 1:
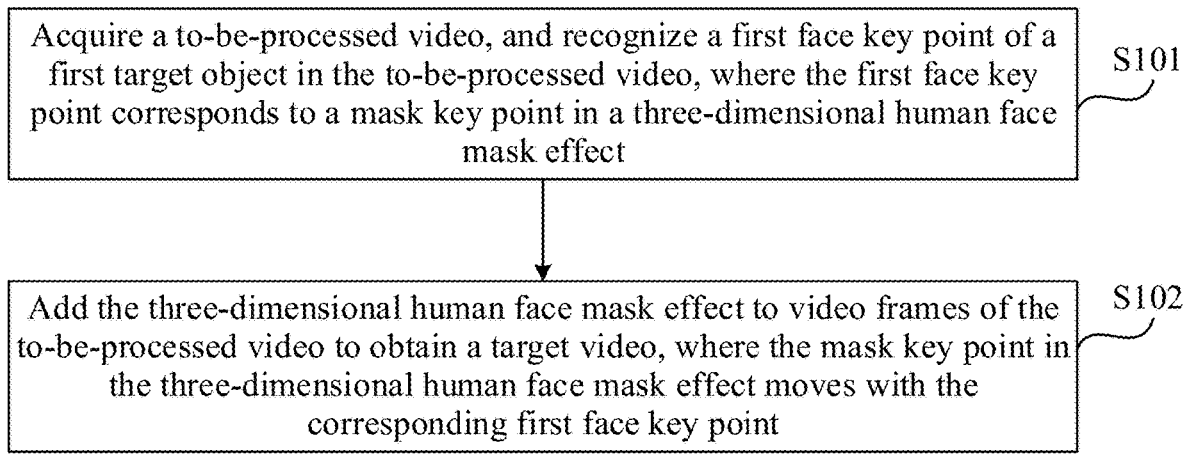
FIG. 1 is a flowchart of a video processing method according to an embodiment of the present disclosure.

Embodiments of the present disclosure are described in more detail hereinafter with reference to drawings. Although some embodiments of the present disclosure are shown in the drawings, it is to be understood that the present disclosure may be implemented in various forms and should not be interpreted as being limited to the embodiments set forth herein. Conversely, these embodiments are provided for more thorough and complete understanding of the present disclosure. It is to be understood that the drawings and the embodiments of the present disclosure are illustrative and not intended to limit the scope of the present disclosure.

It is to be understood that various steps recorded in the method embodiments of the present disclosure may be performed in a different order, and/or in parallel. Additionally, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given hereinafter.

It is to be noted that references to "first", "second" and the like in the present disclosure are merely intended to distinguish one from another apparatus, module or unit and are not intended to limit the order or interrelationship of the functions performed by the apparatus, module or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

Names of messages or information exchanged between multiple apparatuses in the embodiments of the present disclosure are used for an illustrative purpose and are not to limit the scope of such messages or information.

FIG. 1 is a flowchart of a video processing method according to an embodiment of the present disclosure. The method may be executed by a video processing apparatus which may be implemented by software and/or hardware and may be configured in an electronic device. Typically, the apparatus may be configured in a mobile phone or a tablet computer. The video processing method provided in the embodiment of the present disclosure is applicable to a scene of adding a three-dimensional human face mask effect to a video. As shown in FIG. 1, the video processing method provided in the embodiment may include steps described below.

In S101, a to-be-processed video is acquired, and a first face key point of a first target object in the to-be-processed video is recognized, where the first face key point corresponds to a mask key point in a three-dimensional human face mask effect.

The to-be-processed video may be a video which needs to be processed currently, such as a video which currently needs to be added with a three-dimensional human face mask effect; or the to-be-processed video may be a video shot by a camera in real time or a pre-shot video. The first target object may be a certain shot object in the to-be-processed video, such as a certain person shot in the to-be-processed video. The first target object may be determined based on a selection operation of a user, that is, a receiving object selected by the user may be used as the first target object. There may be multiple first face key points. The first face key points may be face key points of the first target object, such as key points on a human face of the first target object. The first face key points may correspond to the mask key points in the three-dimensional human face mask effect in a one-to-one correspondence, or correspond to some mask key points in the three-dimensional human face mask effect. The three-dimensional human face mask effect may be a three-dimensional mask effect of a human face shape or other shapes. The mask key points may be key points in the three-dimensional human face mask effect.

For example, the to-be-processed video may be acquired, and the first face key point corresponding to each mask key point in the to-be-processed video is recognized according to the mask key point in the three-dimensional human face mask effect. For example, when a video shot by a camera in real time is processed, a video frame collected by the camera may be acquired in real time, and a face key point of the first target object in the video frame may be recognized as the first face key point according to the mask key point in the three-dimensional human face mask effect. Here, the face key point and the mask key point that correspond to each other have the same meaning. For example, the face key point and the mask key point that correspond to each other may be the key points located on the same position of the same face part (such as the eyes, the mouth, the nose, etc.).

In S102, the three-dimensional human face mask effect is added to video frames of the to-be-processed video to obtain a target video, where the mask key point in the three-dimensional human face mask effect moves with the corresponding first face key point.

In the embodiment, the three-dimensional human face mask effect of which the mask key point moves with the face key point of the person shot in the video may be added to the video, thereby presenting a visual effect that the mask performs a face action with the person simultaneously, and increasing the interest of the pictures of the video.

Moreover, in the embodiment, the three-dimensional human face mask effect, in addition to being used as a video processing effect, may also be encapsulated as a module in an effect creation tool, such as a three-dimensional human face mask module. Accordingly, a designer can directly call the three-dimensional human face mask module in the effect creation tool for use. For example, the three-dimensional human face mask effect may be directly modified to obtain a new three-dimensional human face mask effect, such as a special-shaped three-dimensional human face mask effect; or creation, such as makeup effect creation, may further be performed based on the three-dimensional human face mask effect to obtain a corresponding effect. In addition, in the design process, the to-be-processed video preset or shot by the camera in real time may be processed through the current effect, and the processed video is displayed, so that the designer can preview the effect of the effect, which is convenient for the creation of the designer.

For example, each mask key point in the three-dimensional human face mask effect may be controlled to move with the corresponding first face key point. For example, for each to-be-processed video frame, according to the position of one or more or all first face key points of the first target object, which have a corresponding mask key point, on the face of the first target object in the to-be-processed video frame, the position of the corresponding mask key point in the three-dimensional human face mask effect is adjusted to obtain the three-dimensional human face mask effect corresponding to the to-be-processed video frame, and the three-dimensional human face mask effect is added to the to-be-processed video frame.

In the embodiment, when the mask key point in the three-dimensional human face mask effect is controlled to move with the corresponding first face key point, the distance that each mask key point moves may be the same as the distance that the corresponding first face key point moves; or the distance that each mask key point moves may be in a set ratio to the distance that the corresponding first face key point moves. A mouth opening action is taken as an example. When the mouth of the first target object opens by a relatively large angle, the mouth in the three-dimensional human face mask effect may be controlled to also open by a relatively large angle, or the mouth in the three-dimensional human face mask effect may be controlled to open by a relatively small angle, which is not limited in the embodiment.

According to the video processing method provided in the embodiment, the to-be-processed video is acquired, and the first face key point of the first target object in the to-be-processed video is recognized, where the first face key point corresponds to a mask key point in a three-dimensional human face mask effect; the three-dimensional human face mask effect is added to video frames of the to-be-processed video to obtain a target video, where the mask key point in the three-dimensional human face mask effect moves with the corresponding first face key point. According to the preceding technical solution used in the embodiment, the three-dimensional human face mask effect presenting the same face action as the person in the video can be added to the video, so that the visual effect and interest of the video are improved. Moreover, when the preceding technical solution is applied to an effect creation tool, a designer can directly view the preview effect of the effect, which is convenient for the creation of the designer.

Figure 2:
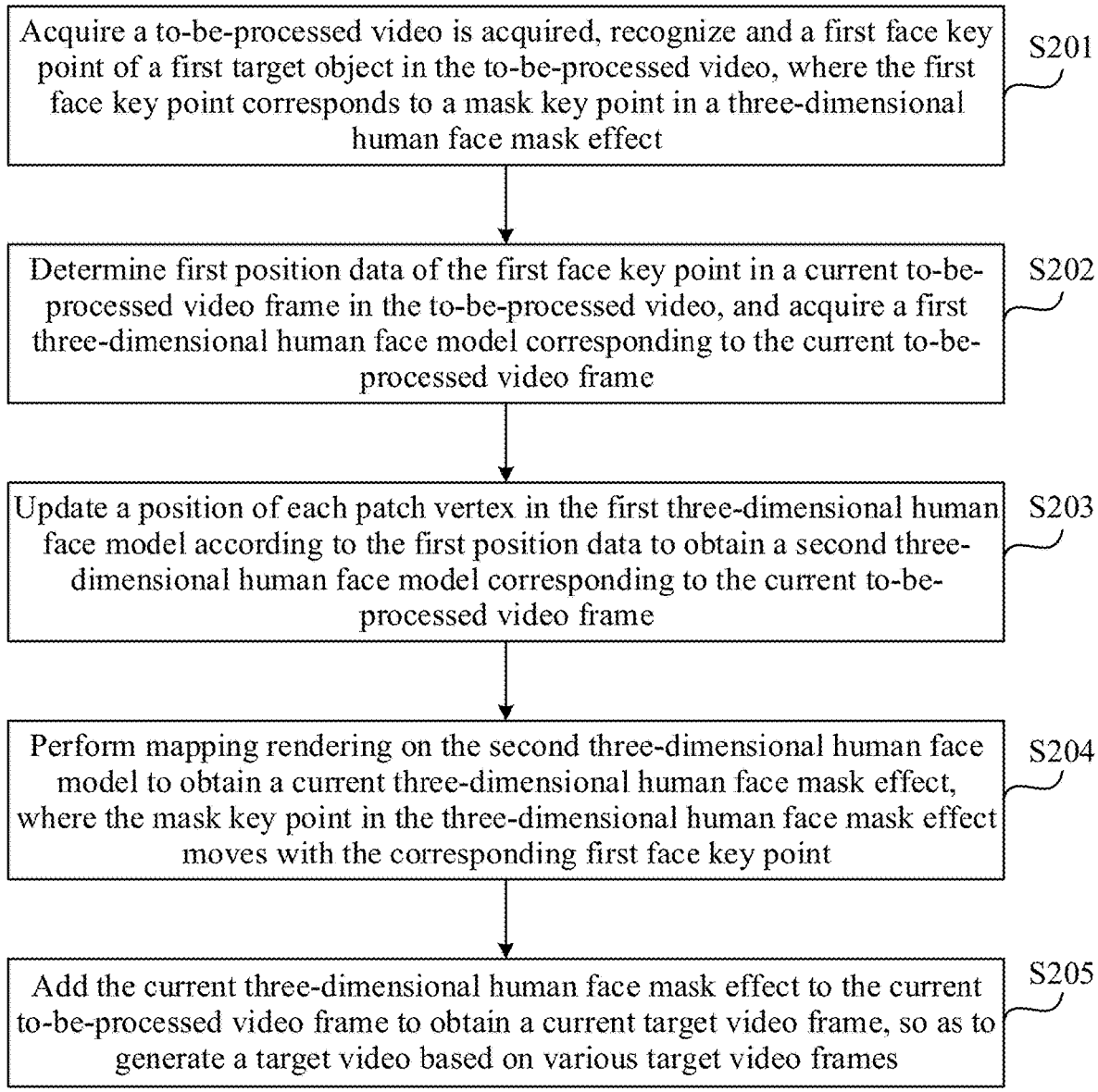
FIG. 2 is a flowchart of another video processing method according to an embodiment of the present disclosure.

FIG. 2 is a flowchart of another video processing method according to an embodiment of the present disclosure. The solution of the embodiment may be combined with one or more of optional solutions of the preceding embodiments. Optionally, the step in which the three-dimensional human face mask effect is added to the video frames of the to-be-processed video includes steps described below. First position data of the first face key point in a current to-be-processed video frame in the to-be-processed video is determined, and a first three-dimensional human face model corresponding to the current to-be-processed video frame is acquired; a position of each patch vertex in the first three-dimensional human face model is updated according to the first position data to obtain a second three-dimensional human face model corresponding to the current to-be-processed video frame; mapping rendering is performed on the second three-dimensional human face model to obtain a current three-dimensional human face mask effect; and the current three-dimensional human face mask effect is added to the current to-be-processed video frame to obtain a current target video frame.

Accordingly, as shown in FIG. 2, the video processing method provided in the embodiment may include steps described below.

In S201, a to-be-processed video is acquired, and a first face key point of a first target object in the to-be-processed video is recognized, where the first face key point corresponds to a mask key point in a three-dimensional human face mask effect.

In S202, first position data of the first face key point in a current to-be-processed video frame in the to-be-processed video is determined, and a first three-dimensional human face model corresponding to the current to-be-processed video frame is acquired.

The current to-be-processed video frame may be a video frame which needs to be processed currently in the to-be-processed video, such as a video frame currently collected by a camera or a video frame being played or processed currently, etc. The first position data may be position data of the first face key point in the current to-be-processed video frame, such as position data of the first face key point on a human face of the first target object.

The first three-dimensional human face model may be a three-dimensional human face model used for generating a three-dimensional human face mask effect. The first three-dimensional human face model may be a three-dimensional human face model of which patch vertices have not been adjusted according to the first position data, such as an initially-obtained three-dimensional human face model or a three-dimensional human face model obtained based on the adjustment on the first face key point in the last to-be-processed video frame, etc. That is, in the embodiment, different adjustments may be performed on the initially-obtained three-dimensional human face model to obtain a three-dimensional human face model for generating a three-dimensional human face mask effect to be added to different video frames; or the three-dimensional human face model obtained after the adjustment on the last to-be-processed video frame may be directly adjusted to obtain a three-dimensional human face model for generating a three-dimensional human face mask effect to be added to the current to-be-processed video frame. The latter case is taken as an example for illustration below. Here, the three-dimensional human face model may be a three-dimensional human face mesh.

Exemplarily, for the current to-be-processed video frame in the to-be-processed video, after the first face key point of the first target object in the current to-be-processed video frame is recognized, the first position data of the first face key point on the human face of the first target object presented in the current to-be-processed video frame is acquired, and a first three-dimensional human face mesh corresponding to the current to-be-processed video frame is acquired. For example, if the current to-be-processed video frame is not a first to-be-processed video frame of the to-be-processed video, a three-dimensional human face model used for generating a three-dimensional human face mask effect added to the last to-be-processed video frame is acquired as the first three-dimensional human face model corresponding to the current to-be-processed video frame; if the current to-be-processed video frame is the first to-be-processed video frame of the to-be-processed video, an initially-obtained three-dimensional human face model is acquired as the first three-dimensional human face model corresponding to the current to-be-processed video frame.

In the embodiment, the initially-obtained three-dimensional human face model may be an original three-dimensional human face created or imported by a user, or a target three-dimensional human face model obtained by performing certain processing on an original three-dimensional human face model, which is not limited in the embodiment.

In an embodiment, before the to-be-processed video is acquired, the method further includes steps described below. An original three-dimensional human face model and unrenderable part information are acquired, where the unrenderable part information is information of an unrenderable part in the original three-dimensional human face model; a patch corresponding to the unrenderable part in the original three-dimensional human face model is deleted according to the unrenderable part information to obtain a target three-dimensional human face model; and the target three-dimensional human face model is used as a first three-dimensional human face model corresponding to a first video frame in the to-be-processed video.

The original three-dimensional human face model may be a three-dimensional human face model created or imported by the user or a three-dimensional human face model preset in a client, and the three-dimensional human face model may contain all parts of a human face. The unrenderable part information may be identification information of an unrenderable part, and the unrenderable part may be determined based on a selection operation of the user. For example, the user may select a part of the three-dimensional human face model which the user does not want to present in the three-dimensional human face mask effect as the unrenderable part, such as the eyes and/or the mouth, etc. The target three-dimensional human face model may be a three-dimensional human face model including only parts that need to be rendered.

Exemplarily, a default three-dimensional human face model may first be created as the original three-dimensional human face model; or a model imported by the user is acquired based on a model import operation of the user, whether the model is a three-dimensional human face model is determined, and when it is determined that the model imported by the user is a three-dimensional human face model, the model imported by the user is used as the original three-dimensional human face model. Then, the unrenderable part information set by the user is acquired, the unrenderable part is determined according to the unrenderable part information, and the patch corresponding to the unrenderable part in the original three-dimensional human face model is deleted to obtain the target three-dimensional human face model. Thus, when the to-be-processed video is subsequently processed, the target three-dimensional human face model may be used as the first three-dimensional human face model corresponding to the first to-be-processed video frame in the to-be-processed video.

Here, the manner for determining whether the model imported by the user is a three-dimensional human face model may be flexibly set. For example, whether the model imported by the user is a three-dimensional human face model may be determined based on whether the number of patch vertices contained in the model matches the number of patch vertices of a three-dimensional human face model. The number of patch vertices of a three-dimensional human face model may be 1220, etc.

In the preceding embodiment, the corresponding patch in the original three-dimensional human face model may be deleted according to the unrenderable part information, so that when the user adds a three-dimensional human face mask effect to the video, human face parts contained in the three-dimensional human face mask effect can be set according to requirements so as to satisfy different needs of the user.

In S203, a position of each patch vertex in the first three-dimensional human face model is updated according to the first position data to obtain a second three-dimensional human face model corresponding to the current to-be-processed video frame.

Each patch vertex in the three-dimensional human face model may be understood as a vertex of each patch in the three-dimensional human face model, and may correspond to the mask key point in the three-dimensional human face mask effect in a one-to-one correspondence, that is, the first face key point may correspond to the patch vertex in the first three-dimensional human face model in a one-to-one correspondence. The second three-dimensional human face model may be a three-dimensional human face model obtained by adjusting the position of the patch vertex.

For example, according to the position data of the first face key point of the first target object in the current to-be-processed video frame, the position of the patch vertex corresponding to the first face key point in the first three-dimensional human face model corresponding to the current to-be-processed video frame may be adjusted. For example, each patch vertex in the first three-dimensional human face model may be adjusted to have the same relative position as the first face key point on the human face of the first target object, so that the second three-dimensional human face model corresponding to the current to-be-processed video frame is obtained.

In S204, mapping rendering is performed on the second three-dimensional human face model to obtain a current three-dimensional human face mask effect, where the mask key point in the three-dimensional human face mask effect moves with the corresponding first face key point.

Exemplarily, after the second three-dimensional human face model is obtained, mapping rendering may be performed on the second three-dimensional human face model to obtain the current three-dimensional human face mask effect. For example, to-be-rendered texture information corresponding to the current to-be-processed video frame may be acquired, and the mapping rendering is performed on the second three-dimensional human face model according to the to-be-rendered texture information to obtain the current three-dimensional human face mask effect. The current three-dimensional human face mask effect may be the three-dimensional human face mask effect added to the current to-be-processed video frame.

In S205, the current three-dimensional human face mask effect is added to the current to-be-processed video frame to obtain a current target video frame, so as to generate a target video based on various target video frames.

In the embodiment, after the current three-dimensional human face mask effect is obtained, the current three-dimensional human face mask effect may be added to the current to-be-processed video frame. For example, the current three-dimensional human face mask effect is added to a preset effect display position of the current to-be-processed video, or the current three-dimensional human face mask effect is added to a face position of a certain object displayed in the current to-be-processed video frame, so as to obtain the current target video frame added with the current three-dimensional human face mask effect, and a preview effect after the three-dimensional human face mask effect is added to the current to-be-processed video frame can be further displayed. Thus, after target video frames corresponding to various to-be-processed video frames in the to-be-processed video are obtained, the target video added with the three-dimensional human face mask effect can be generated according to various target video frames.

According to the video processing method provided in the embodiment, the position of the patch vertex in the three-dimensional human face model is adjusted according to the position data of the first face key point in the current to-be-processed video frame, and the three-dimensional human face mask effect is obtained according to rendering on the adjusted three-dimensional human face model and is added to the current to-be-processed video frame. In this manner, the three-dimensional human face mask effect presenting the same face action as a person shot in the current to-be-processed video frame can be added to the current to-be-processed video frame, and a case is avoided where the same three-dimensional human face mask effect is added to all video frames, so that requirements of the user is satisfied, and the viewing experience of the user on the video after the three-dimensional human face mask effect is added is improved.

Figure 3:
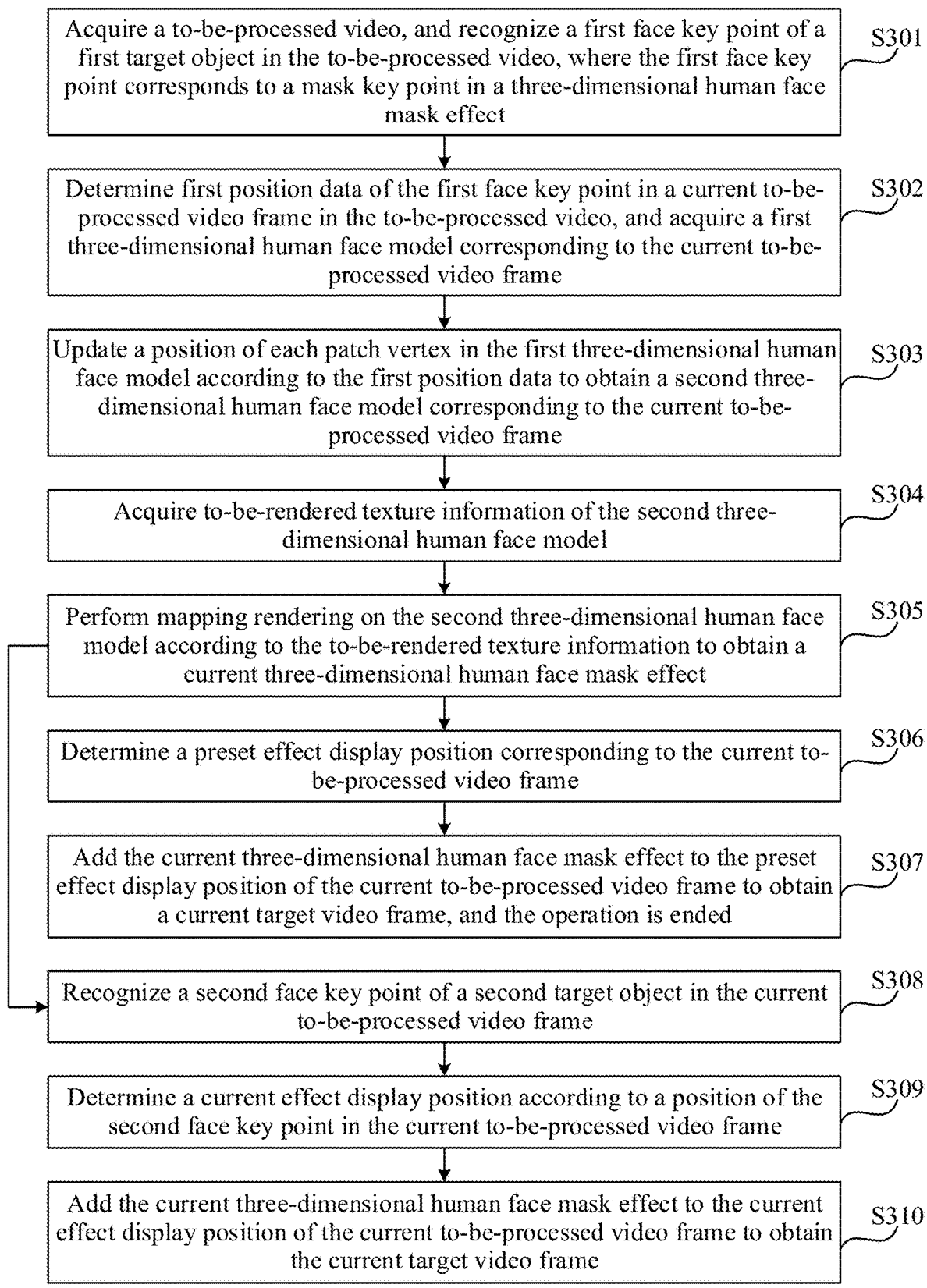
FIG. 3 is a flowchart of another video processing method according to an embodiment of the present disclosure.

FIG. 3 is a flowchart of another video processing method according to an embodiment of the present disclosure. The solution of the embodiment may be combined with one or more of optional solutions of the preceding embodiments. Optionally, the step in which the current three-dimensional human face mask effect is added to the current to-beprocessed video frame to obtain the current target video frame includes steps described below. A preset effect display position corresponding to the current to-be-processed video frame is determined; the current three-dimensional human face mask effect is added to the preset effect display position of the current to-be-processed video frame to obtain the current target video frame.

Optionally, the step in which the current three-dimensional human face mask effect is added to the current to-be-processed video frame to obtain the current target video frame includes steps described below. A second face key point of a second target object in the current to-be-processed video frame is recognized; a current effect display position is determined according to a position of the second face key point in the current to-be-processed video frame; and the current three-dimensional human face mask effect is added to the current effect display position of the current to-be-processed video frame to obtain the current target video frame.

Optionally, the step in which the mapping rendering is performed on the second three-dimensional human face model includes steps described below. To-be-rendered texture information of the second three-dimensional human face model is acquired; and the mapping rendering is performed on the second three-dimensional human face model according to the to-be-rendered texture information.

Accordingly, as shown in FIG. 3, the video processing method provided in the embodiment may include steps described below.

In S301, a to-be-processed video is acquired, and a first face key point of a first target object in the to-be-processed video is recognized, where the first face key point corresponds to a mask key point in a three-dimensional human face mask effect.

In S302, first position data of the first face key point in a current to-be-processed video frame in the to-be-processed video is determined, and a first three-dimensional human face model corresponding to the current to-be-processed video frame is acquired.

In S303, a position of each patch vertex in the first three-dimensional human face model is updated according to the first position data to obtain a second three-dimensional human face model corresponding to the current to-be-processed video frame.

In S304, to-be-rendered texture information of the second three-dimensional human face model is acquired.

For example, preset texture information may be acquired as the to-be-rendered texture information of the second three-dimensional human face model; or texture information of a material selected by a user may be acquired as the to-be-rendered texture information of the second three-dimensional human face model; or texture information presented in the current to-be-processed video frame, such as texture information of a corresponding person presented in the current to-be-processed video frame, may be acquired as the to-be-rendered texture information of the second three-dimensional human face model.

In an embodiment, the to-be-rendered texture information may be determined based on a to-be-rendered material preset by the user or a developer. At this time, the step in which the to-be-rendered texture information of the second three-dimensional human face model is acquired may include the step described below. A to-be-rendered material corresponding to the current to-be-processed video frame is determined, and texture information of the to-be-rendered material is acquired as the to-be-rendered texture information of the second three-dimensional human face model.

For example, the developer may preset the to-be-rendered material; or the user may preset the to-be-rendered material corresponding to the to-be-processed video or preset to-be-rendered materials corresponding to different video frames in the to-be-processed video. Thus, when the current to-be-processed video frame is processed, the to-be-rendered material corresponding to the current to-be-processed video frame may be determined, and the texture information of the to-be-rendered material is acquired as the to-be-rendered texture information of the second three-dimensional human face model corresponding to the current to-be-processed video frame.

In another embodiment, the to-be-rendered texture information may be determined based on texture of the corresponding object shot in the current to-be-processed video frame. At this time, the step in which current to-be-rendered texture information of the second three-dimensional human face model is acquired may include the step described below. A third target object in the current to-be-processed video frame is recognized, and face texture information of the third target object is acquired as the to-be-rendered texture information of the second three-dimensional human face model.

The third target object may be a certain shot object in the current to-be-processed video frame, such as a certain person shot in the current to-be-processed video frame, and may be determined based on a selection operation of the user. That is, a texture source object selected by the user may be used as the third target object.

In the embodiment, the third target object may be an object which is the same as or different from the first target object, that is, in the embodiment, a three-dimensional human face mask effect may be generated according to a face key point and face texture of the same object in the to-be-processed video, so that the three-dimensional human face mask effect presents the same face action and the same face texture as the object; or a three-dimensional human face mask effect may be generated according to a face key point of a certain object and face texture of another object in the to-be-processed video, so that the three-dimensional human face mask effect presents the same face action as the certain object and the same face texture as the another object in the to-be-processed video; in this manner, the three-dimensional human face mask effect can present the effect that an object presents the face action of another object, thereby further improving the interest of the video.

For example, the user may pre-select a certain object in the to-be-processed video as the third target object corresponding to each video frame of the to-be-processed video, or preset third target objects corresponding to different video frames in the to-be-processed video. Thus, when the current to-be-processed video frame is processed, the third target object in the current to-be-processed video frame may be recognized, and the face texture information of the third target object is extracted as the to-be-rendered texture information of the second three-dimensional human face model corresponding to the current to-be-processed video frame.

In the preceding embodiment, optionally, the step in which the face texture information of the third target object is acquired includes steps described below. Coordinate information corresponding to each patch vertex in the second three-dimensional human face model in face texture mapping is separately determined; face sampling is performed on the third target object according to the coordinate information to obtain face sampling data of the third target object; and the face texture information of the third target object is generated according to the face sampling data.

Exemplarily, when the face texture information of the third target object is extracted, the coordinate information corresponding to each patch vertex in the second three-dimensional human face model in the face texture mapping may be determined, that is, UV coordinates corresponding to each patch vertex in the second three-dimensional human face model in the to-be-processed video frame are determined; according to the coordinate information, color information of the face of the third target object presented in the current to-be-processed video frame is sampled to obtain the face sampling data of the third target object; then, the face sampling data is further processed, for example, smoothing processing is performed on each sampling data, so as to obtain the face texture information of the third target object.

In S305, mapping rendering is performed on the second three-dimensional human face model according to the to-be-rendered texture information to obtain a current three-dimensional human face mask effect, and S306 or S308 is executed.

In the embodiment, after the to-be-rendered texture information is obtained, the mapping rendering can be performed on the second three-dimensional human face model to obtain the current three-dimensional human face mask effect which can be added to the current to-be-processed video frame.

In the embodiment, the manner for performing the mapping rendering on the second three-dimensional human face model may be set according to requirements. For example, the UV coordinates corresponding to each patch vertex in the second three-dimensional human face model in the face texture mapping may be calculated according to the each patch vertex in the second three-dimensional human face model, rendering is performed on the face texture mapping according to the UV coordinates and the obtained to-be-rendered texture information to obtain the face texture mapping corresponding to the second three-dimensional human face model, and rendering is performed on the second three-dimensional human face model based on the face texture mapping to obtain the current three-dimensional human face mask effect. At this time, optionally, the step in which the mapping rendering is performed on the second three-dimensional human face model according to the to-be-rendered texture information includes steps described below. The face texture mapping is generated according to the to-be-rendered texture information; and rendering is performed on the second three-dimensional human face model based on the face texture mapping.

In S306, a preset effect display position corresponding to the current to-be-processed video frame is determined.

In S307, the current three-dimensional human face mask effect is added to the preset effect display position of the current to-be-processed video frame to obtain a current target video frame, and the operation is ended.

In the embodiment, the three-dimensional human face mask effect may be displayed at the preset effect display position. The preset effect display position may be a position preset by the developer for displaying a three-dimensional human face mask effect, or may be a position to which the user drags a three-dimensional human face mask effect, that is, the user can change the display position of the three-dimensional human face mask effect in the to-be-processed video frame by dragging the currently displayed three-dimensional human face mask effect.

For example, a display position set by the user or the developer may be acquired as the preset effect display position corresponding to the current to-be-processed video frame, and the generated current three-dimensional human face mask effect is added to the preset effect display position of the current to-be-processed video frame to obtain the current target video frame corresponding to the current to-be-processed video frame.

In S308, a second face key point of a second target object in the current to-be-processed video frame is recognized.

In the embodiment, the three-dimensional human face mask effect may also be displayed at a display position of the corresponding object shot in the to-be-processed video, that is, the three-dimensional human face mask effect may be controlled to move with the corresponding object shot in the to-be-processed video, so that a visual effect is created that the object shot in the to-be-processed video wears a three-dimensional human face mask.

The second target object may be a certain shot object in the current to-be-processed video frame, such as a certain person shot in the current to-be-processed video frame, and may be determined based on a selection operation of the user. That is, a texture source object selected by the user may be used as the second target object. In the embodiment, the second target object may be an object which is the same as or different from the first target object. For example, in the embodiment, a three-dimensional human face mask effect may be generated according to a face key point of the same object in the to-be-processed video, and the three-dimensional human face mask effect is controlled to move with the object; or a three-dimensional human face mask effect may be generated according to a face key point of a certain object in the to-be-processed video, and the three-dimensional human face mask effect is controlled to move with another object in the to-be-processed video, which is not limited in the embodiment. The second face key point may be a face key point of the second target object, and may correspond to the mask key point in the three-dimensional human face mask effect.

For example, the second target object in the current to-be-processed video frame may be determined, and a key point of the face of the second target object presented in the current to-be-processed video frame may be recognized as the second face key point.

In S309, a current effect display position is determined according to a position of the second face key point in the current to-be-processed video frame.

For example, after the second face key point of the second target object in the current to-be-processed video frame is recognized and obtained, the position of each second face key point in the current to-be-processed video frame may further be determined, and the display position (that is, the current effect display position) of the three-dimensional human face mask effect in the current to-be-processed video frame is determined according to the position of each second face key point in the current to-be-processed video frame. For example, according to the position of each second face key point in the current to-be-processed video frame and each mask key point in the three-dimensional human face mask effect, a position which enables the maximum number of mask key points in the three-dimensional human face mask effect to coincide with corresponding second face key points may be selected as the current effect display position; or a position where each mask key point in the three-dimensional human face mask effect has the minimum variance with the corresponding second face key point may be selected as the current effect display position, etc.

In S310, the current three-dimensional human face mask effect is added to the current effect display position of the current to-be-processed video frame to obtain the current target video frame.

In the embodiment, after the current effect display position is determined, the generated current three-dimensional human face mask effect may be added to the current effect display position of the current to-be-processed video frame to obtain the current target video frame corresponding to the current to-be-processed video frame.

According to the video processing method provided in the embodiment, the three-dimensional human face mask effect can be obtained by using different manners of texture rendering, and the three-dimensional human face mask effect can be displayed at different positions, so that the visual effect of the three-dimensional human face mask effect and the interest of the picture of the video are improved, different requirements of the user are satisfied, and the user experience is improved.

Figure 4:
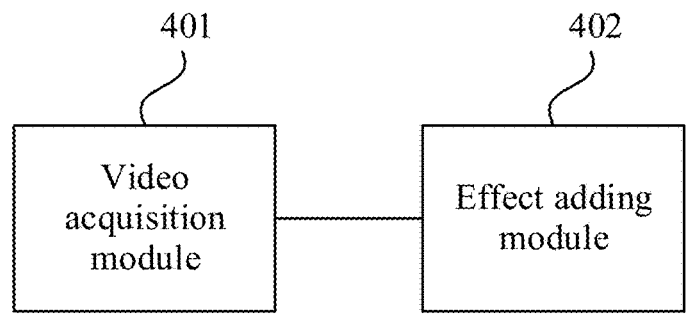
FIG. 4 is a block diagram of a video processing apparatus according to an embodiment of the present disclosure.

FIG. 4 is a block diagram of a video processing apparatus according to an embodiment of the present disclosure. The apparatus may be implemented by software and/or hardware and may be configured in an electronic device. Typically, the apparatus may be configured in a mobile phone or a tablet computer, and may process a video by executing the video processing method. As shown in FIG. 4, the video processing apparatus provided in the embodiment may include a video acquisition module 401 and an effect adding module 402.

The video acquisition module 401 is configured to acquire a to-be-processed video, and recognize a first face key point of a first target object in the to-be-processed video, where the first face key point corresponds to a mask key point in a three-dimensional human face mask effect.

The effect adding module 402 is configured to add the three-dimensional human face mask effect to video frames of the to-be-processed video to obtain a target video, where the mask key point in the three-dimensional human face mask effect moves with the corresponding first face key point.

According to the video processing apparatus provided in the embodiment, the to-be-processed video is acquired and the first face key point of the first target object in the to-be-processed video is recognized through the video acquisition module, where the first face key point corresponds to the mask key point in the three-dimensional human face mask effect; and the three-dimensional human face mask effect is added to the video frame of the to-be-processed video through the effect adding module to obtain the target video, where the mask key point in the three-dimensional human face mask effect moves with the corresponding first face key point. According to the preceding technical solution used in the embodiment, the three-dimensional human face mask effect presenting the same face action as a person in the video can be added to the video, so that the visual effect and interest of the video are improved. Moreover, when the preceding technical solution is applied to an effect creation tool, a designer can directly view the preview effect of the effect, which is convenient for the creation of the designer.

In the preceding solution, the effect adding module 402 may include a model acquisition unit, a position updating unit, a mapping rendering unit and an effect adding unit. The model acquisition unit is configured to determine first position data of the first face key point in a current to-be-processed video frame in the to-be-processed video, and acquire a first three-dimensional human face model corresponding to the current to-be-processed video frame. The position updating unit is configured to update a position of each patch vertex in the first three-dimensional human face model according to the first position data to obtain a second three-dimensional human face model corresponding to the current to-be-processed video frame. The mapping rendering unit is configured to perform mapping rendering on the second three-dimensional human face model to obtain a current three-dimensional human face mask effect. The effect adding unit is configured to add the current three-dimensional human face mask effect to the current to-be-processed video frame to obtain a current target video frame.

In the preceding solution, the effect adding unit may include a preset position determination subunit and a first effect adding subunit. The preset position determination subunit is configured to determine a preset effect display position corresponding to the current to-be-processed video frame. The first effect adding subunit is configured to add the current three-dimensional human face mask effect to the preset effect display position of the current to-be-processed video frame to obtain the current target video frame.

In the preceding solution, the effect adding unit may include a key point recognition subunit, a current position determination subunit and a second effect adding subunit. The key point recognition subunit is configured to recognize a second face key point of a second target object in the current to-be-processed video frame. The current position determination subunit is configured to determine a current effect display position according to a position of the second face key point in the current to-be-processed video frame. The second effect adding subunit is configured to add the current three-dimensional human face mask effect to the current effect display position of the current to-be-processed video frame to obtain the current target video frame.

In the preceding solution, the mapping rendering unit may include a texture acquisition subunit and a mapping rendering subunit. The texture acquisition subunit is configured to acquire to-be-rendered texture information of the second three-dimensional human face model. The mapping rendering subunit is configured to perform the mapping rendering on the second three-dimensional human face model according to the to-be-rendered texture information.

In the preceding solution, the texture acquisition subunit may be configured to determine a to-be-rendered material corresponding to the current to-be-processed video frame, and acquire texture information of the to-be-rendered material as the to-be-rendered texture information of the second three-dimensional human face model.

In the preceding solution, the texture acquisition subunit may be configured to recognize a third target object in the current to-be-processed video frame, and acquire face texture information of the third target object as the to-be-rendered texture information of the second three-dimensional human face model.

In the preceding solution, the texture acquisition subunit may be configured to separately determine coordinate information corresponding to each patch vertex in the second three-dimensional human face model in face texture mapping; perform face sampling on the third target object according to the coordinate information to obtain face sampling data of the third target object; and generate the face texture information of the third target object according to the face sampling data.

In the preceding solution, the mapping rendering subunit may be configured to generate the face texture mapping according to the to-be-rendered texture information; and perform rendering on the second three-dimensional human face model based on the face texture mapping.

Further, the video processing apparatus provided in the embodiment may further include an information acquisition module, a patch deletion module and a model determination module. The information acquisition module is configured to before the to-be-processed video is acquired, acquire an original three-dimensional human face model and unrenderable part information, where the unrenderable part information is information of an unrenderable part in the original three-dimensional human face model. The patch deletion module is configured to delete a patch corresponding to the unrenderable part in the original three-dimensional human face model according to the unrenderable part information to obtain a target three-dimensional human face model. The model determination module is configured to use the target three-dimensional human face model as a first three-dimensional human face model corresponding to a first video frame in the to-be-processed video.

The video processing apparatus provided in the embodiment of the present disclosure may execute the video processing method provided in any embodiment of the present disclosure, and has functional modules for and effects of executing the video processing method. For technical details not described in detail in the embodiment, reference may be made to the video processing method provided in any embodiment of the present disclosure.

Figure 5:
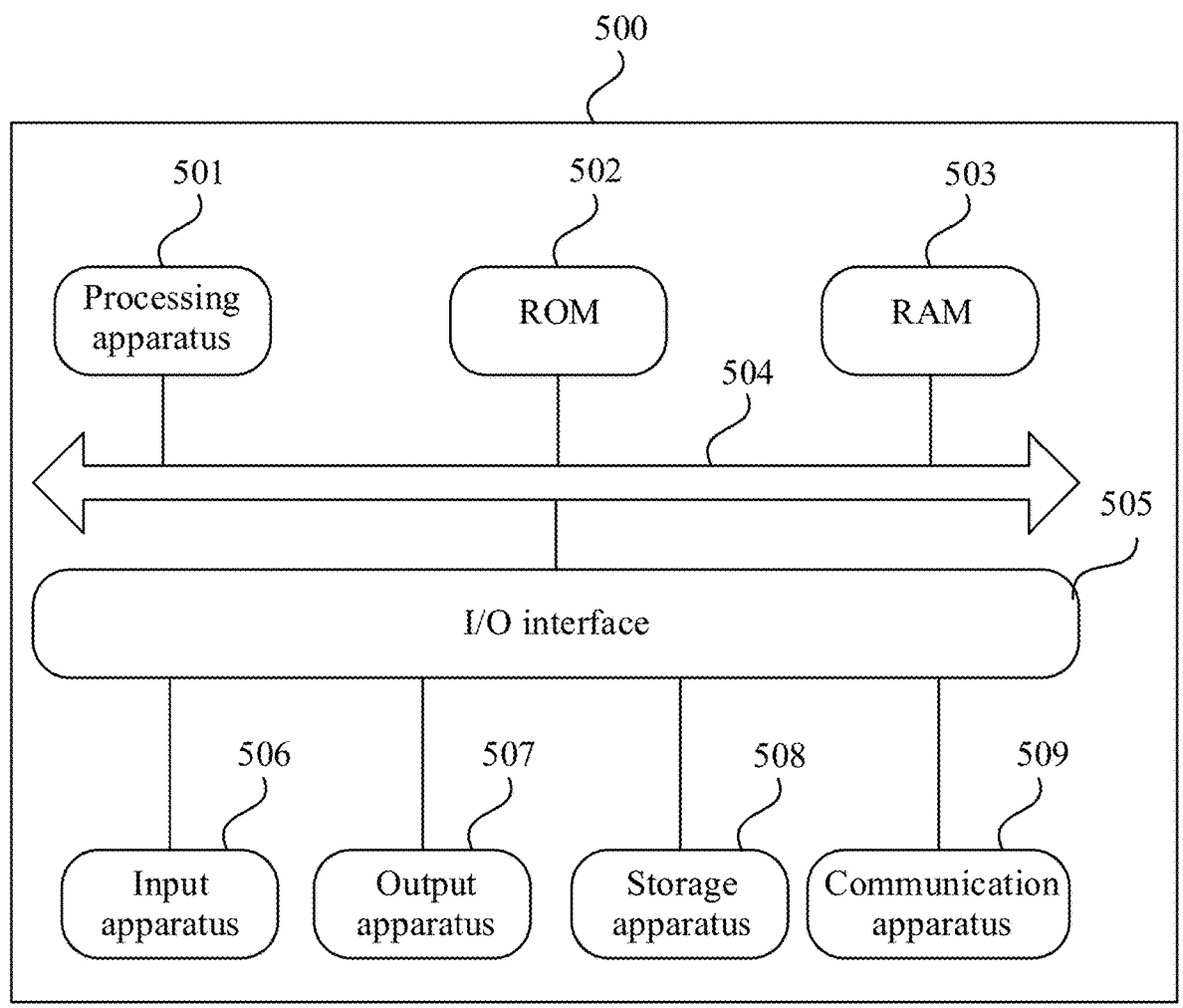
FIG. 5 is a structural diagram of an electronic device according to an embodiment of the present disclosure.

Referring to FIG. 5, the structural diagram of an electronic device 500 (for example, a terminal device) applicable to implementing the embodiments of the present disclosure is illustrated below. The terminal device in the embodiment of the present disclosure may include, but is not limited to, mobile terminals such as a mobile phone, a laptop computer, a digital broadcasting receiver, a personal digital assistant (PDA), a PAD, a portable media player (PMP) and an in-vehicle terminal (for example, an in-vehicle navigation terminal), and stationary terminals such as a digital television (TV) and a desktop computer. The electronic device shown in FIG. 5 is merely an example and should not impose any limitation on the function and scope of use of the embodiments of the present disclosure.

As shown in FIG. 5, the electronic device 500 may include the processing apparatus 501 (such as a central processing unit and a graphics processing unit). The processing apparatus 501 may perform various types of appropriate operations and processing based on a program stored in a read-only memory (ROM) 502 or a program loaded from a storage apparatus 508 to a random-access memory (RAM) 503. Various programs and data required for the operation of the electronic device 500 are also stored in the RAM 503. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 such as a touch screen, a touch pad, a keyboard, a mouse, a camera, a microphone, an accelerometer and a gyroscope; an output apparatus 507 such as a liquid-crystal display (LCD), a speaker and a vibrator; the storage apparatus 508 such as a magnetic tape and a hard disk; and a communication apparatus 509. The communication apparatus 509 may allow the electronic device 500 to perform wireless or wired communication with other devices to exchange data. Although FIG. 5 shows the electronic device 500 having various apparatuses, it is to be understood that not all of the apparatuses shown herein need to be implemented or present. Alternatively, more or fewer apparatuses may be implemented or present.

Particularly, according to the embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the method of the embodiments of the present disclosure are performed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by an instruction execution system, apparatus or device or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms, including, but not limited to, an electromagnetic signal, an optical signal, or any suitable combination thereof. The computer-readable signal medium may also be any computer-readable medium except the computer-readable storage medium. The computer-readable signal medium may send, propagate or transmit a program used by an instruction execution system, apparatus or device or used in conjunction with an instruction execution system, apparatus or device. The program codes included in the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area networks (WAN), an internet (such as the Internet) and a peer-to-peer network (such as an Ad-Hoc network), as well as any network currently known or to be developed in the future.

The preceding computer-readable medium may be included in the preceding electronic device or may exist alone without being assembled into the electronic device.

The preceding computer-readable medium carries one or more programs which, when executed by the electronic device, cause the electronic device to: acquire a to-beprocessed video, and recognize a first face key point of a first target object in the to-be-processed video, where the first face key point corresponds to a mask key point in a three-dimensional human face mask effect; add the three-dimensional human face mask effect to video frames of the to-be-processed video to obtain a target video, where the mask key point in the three-dimensional human face mask effect moves with the corresponding first face key point.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

Flowcharts and block diagrams among the drawings illustrate architectures, functions, and operations possible to implement in accordance with the system, method, and computer program product in various embodiments of the present disclosure. In this regard, each block in the flowcharts or block diagrams may represent a module, a program segment, or part of codes that contains one or more executable instructions for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The involved units described in the embodiments of the present disclosure may be implemented by software or hardware. The name of a module is not intended to limit the unit itself in some circumstance.

The functions described above herein may be executed, at least partially, by one or more hardware logic components. For example, without limitation, example types of hardware logic components that may be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program used by an instruction execution system, apparatus or device or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. Concrete examples of the machine-readable storage medium include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof.

According to one or more embodiments of the present disclosure, example 1 provides a video processing method. The method includes steps below.

A to-be-processed video is acquired, and a first face key point of a first target object in the to-be-processed video is recognized, where the first face key point corresponds to a mask key point in a three-dimensional human face mask effect.

The three-dimensional human face mask effect is added to video frames of the to-be-processed video to obtain a target video, where the mask key point in the three-dimensional human face mask effect moves with the corresponding first face key point.

According to one or more embodiments of the present disclosure, in example 2, according to the method of example 1, the step in which the three-dimensional human face mask effect is added to the video frame of the to-be-processed video includes steps described below First position data of the first face key point in a current to-be-processed video frame in the to-be-processed video is determined, and a first three-dimensional human face model corresponding to the current to-be-processed video frame is acquired.

A position of each patch vertex in the first three-dimensional human face model is updated according to the first position data to obtain a second three-dimensional human face model corresponding to the current to-be-processed video frame.

Mapping rendering is performed on the second three-dimensional human face model to obtain a current three-dimensional human face mask effect.

The current three-dimensional human face mask effect is added to the current to-be-processed video frame to obtain a current target video frame.

According to one or more embodiments of the present disclosure, in example 3, according to the method of example 2, the step in which the current three-dimensional human face mask effect is added to the current to-be-processed video frame to obtain the current target video frame includes steps described below.

A preset effect display position corresponding to the current to-be-processed video frame is determined.

The current three-dimensional human face mask effect is added to the preset effect display position of the current to-be-processed video frame to obtain the current target video frame.

According to one or more embodiments of the present disclosure, in example 4, according to the method of example 2, the step in which the current three-dimensional human face mask effect is added to the current to-be-processed video frame to obtain the current target video frame includes steps described below.

A second face key point of a second target object in the current to-be-processed video frame is recognized.

A current effect display position is determined according to a position of the second face key point in the current to-be-processed video frame.

The current three-dimensional human face mask effect is added to the current effect display position of the current to-be-processed video frame to obtain the current target video frame.

According to one or more embodiments of the present disclosure, in example 5, according to the method of example 2, the step in which the mapping rendering is performed on the second three-dimensional human face model includes steps described below.

To-be-rendered texture information of the second three-dimensional human face model is acquired.

The mapping rendering is performed on the second three-dimensional human face model according to the to-be-rendered texture information.

According to one or more embodiments of the present disclosure, in example 6, according to the method of example 5, the step in which the to-be-rendered texture information of the second three-dimensional human face model is acquired includes the step described below.

A to-be-rendered material corresponding to the current to-be-processed video frame is determined, and texture information of the to-be-rendered material is acquired as the to-be-rendered texture information of the second three-dimensional human face model.

According to one or more embodiments of the present disclosure, in example 7, according to the method of example 6, the step in which current to-be-rendered texture information of the second three-dimensional human face model is acquired includes the step described below.

A third target object in the current to-be-processed video frame is recognized, and face texture information of the third target object is acquired as the to-be-rendered texture information of the second three-dimensional human face model.

According to one or more embodiments of the present disclosure, in example 8, according to the method of example 7, the step in which the face texture information of the third target object is acquired includes steps described below.

Coordinate information corresponding to each patch vertex in the second three-dimensional human face model in face texture mapping is separately determined.

Face sampling is performed on the third target object according to the coordinate information to obtain face sampling data of the third target object.

The face texture information of the third target object is generated according to the face sampling data.

According to one or more embodiments of the present disclosure, in example 9, according to the method of any one of example 5 to example 8, the step in which the mapping rendering is performed on the second three-dimensional human face model according to the to-be-rendered texture information includes the step described below.

The face texture mapping is generated according to the to-be-rendered texture information.

Rendering is performed on the second three-dimensional human face model based on the face texture mapping.

According to one or more embodiments of the present disclosure, in example 10, according to the method of any one of example 2 to example 8, before the to-be-processed video is acquired, steps described below are further included.

An original three-dimensional human face model and unrenderable part information are acquired, where the unrenderable part information is information of an unrenderable part in the original three-dimensional human face model.

A patch corresponding to the unrenderable part in the original three-dimensional human face model is deleted according to the unrenderable part information to obtain a target three-dimensional human face model.

The target three-dimensional human face model is used as a first three-dimensional human face model corresponding to a first video frame in the to-be-processed video.

According to one or more embodiments of the present disclosure, example 11 provides a video processing apparatus. The apparatus includes a video acquisition module and an effect adding module.

The video acquisition module is configured to acquire a to-be-processed video, and recognize a first face key point of a first target object in the to-be-processed video, where the first face key point corresponds to a mask key point in a three-dimensional human face mask effect.

The effect adding module is configured to add the three-dimensional human face mask effect to video frames of the to-be-processed video to obtain a target video, where the mask key point in the three-dimensional human face mask effect moves with the corresponding first face key point.

According to one or more embodiments of the present disclosure, example 12 provides an electronic device. The electronic device includes one or more processors and a memory configured to store one or more programs.

The one or more programs, when executed by the one or more processors, cause the one or more processors to implement the video processing method according to any one of example 1 to example 10.

According to one or more embodiments of the present disclosure, example 13 provides a computer-readable medium storing a computer program. The computer program, when executed by a processor, implements the video processing method according to any one of example 1 to example 10.

According to one or more embodiments of the present disclosure, example 14 provides a computer program product. The computer program product, when executed by a computer, causes the computer to implement the video processing method according to any one of example 1 to example 10.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter is described in the language specific to structural features and/or methodological logic acts, it is to be understood that the subject matter defined in the appended claims is not necessarily limited to the specific features or acts described above. Conversely, the particular features and acts described above are merely example forms for implementing the claims.

What is claimed is:

1. A video processing method, comprising:
acquiring a first video, and recognizing at least one first face key point of a first target object in the first video, wherein the at least one first face key point corresponds to at least one mask key point in a three-dimensional human face mask effect; and
adding the three-dimensional human face mask effect to video frames of the first video to obtain a second video, wherein the at least one mask key point in the three-dimensional human face mask effect moves with a corresponding first face key point;
wherein adding the three-dimensional human face mask effect to the video frames of the first video comprises:
determining first position data of the at least one first face key point in a current first video frame in the first video, and acquiring a first three-dimensional human face model corresponding to the current first video frame;
updating a position of each patch vertex in the first three-dimensional human face model according to the first position data to obtain a second three-dimensional human face model corresponding to the current first video frame;
performing mapping rendering on the second three-dimensional human face model to obtain a current three-dimensional human face mask effect; and
adding the current three-dimensional human face mask effect to the current first video frame to obtain a current second video frame; and
acquiring to-be-rendered texture information of the second three-dimensional human face model, comprising:
determining a to-be-rendered material corresponding to the current first video frame, and acquiring texture information of the to-be-rendered material as the to-be-rendered texture information of the second three-dimensional human face model.

2. The method according to claim 1, wherein adding the current three-dimensional human face mask effect to the current first video frame to obtain the current second video frame comprises:
determining a preset effect display position corresponding to the current first video frame; and
adding the current three-dimensional human face mask effect to the preset effect display position of the current first video frame to obtain the current second video frame.

3. The method according to claim 2, before acquiring the first video, further comprising:
acquiring an original three-dimensional human face model and unrenderable part information, wherein the unrenderable part information is information of an unrenderable part in the original three-dimensional human face model;
deleting a patch corresponding to the unrenderable part in the original three-dimensional human face model according to the unrenderable part information to obtain a target three-dimensional human face model; and
using the target three-dimensional human face model as a first three-dimensional human face model corresponding to a first video frame in the first video.

4. The method according to claim 1, wherein adding the current three-dimensional human face mask effect to the current first video frame to obtain the current second video frame comprises:
recognizing a second face key point of a second target object in the current first video frame;
determining a current effect display position according to a position of the second face key point in the current first video frame; and
adding the current three-dimensional human face mask effect to the current effect display position of the current first video frame to obtain the current second video frame.

5. The method according to claim 4, before acquiring the first video, further comprising:
acquiring an original three-dimensional human face model and unrenderable part information, wherein the unrenderable part information is information of an unrenderable part in the original three-dimensional human face model;
deleting a patch corresponding to the unrenderable part in the original three-dimensional human face model according to the unrenderable part information to obtain a target three-dimensional human face model; and
using the target three-dimensional human face model as a first three-dimensional human face model corresponding to a first video frame in the first video.

6. The method according to claim 1, wherein performing the mapping rendering on the second three-dimensional human face model comprises:
performing the mapping rendering on the second three-dimensional human face model according to the to-be-rendered texture information.

7. The method according to claim 6, wherein performing the mapping rendering on the second three-dimensional human face model according to the to-be-rendered texture information comprises:
generating the face texture mapping according to the to-be-rendered texture information; and
performing rendering on the second three-dimensional human face model based on the face texture mapping.

8. The method according to claim 6, before acquiring the first video, further comprising:
acquiring an original three-dimensional human face model and unrenderable part information, wherein the unrenderable part information is information of an unrenderable part in the original three-dimensional human face model;
deleting a patch corresponding to the unrenderable part in the original three-dimensional human face model according to the unrenderable part information to obtain a target three-dimensional human face model; and
using the target three-dimensional human face model as a first three-dimensional human face model corresponding to a first video frame in the first video.

9. The method according to claim 1, wherein acquiring the to-be-rendered texture information of the second three-dimensional human face model comprises:

recognizing a third target object in the current first video frame, and acquiring face texture information of the third target object as the to-be-rendered texture information of the second three-dimensional human face model.

10. The method according to claim 9, wherein acquiring the face texture information of the third target object comprises:
separately determining coordinate information corresponding to each patch vertex in the second three-dimensional human face model in face texture mapping;
performing face sampling on the third target object according to the coordinate information to obtain face sampling data of the third target object; and
generating the face texture information of the third target object according to the face sampling data.

11. The method according to claim 10, wherein performing the mapping rendering on the second three-dimensional human face model according to the to-be-rendered texture information comprises:
generating the face texture mapping according to the to-be-rendered texture information; and
performing rendering on the second three-dimensional human face model based on the face texture mapping.

12. The method according to claim 9, wherein performing the mapping rendering on the second three-dimensional human face model according to the to-be-rendered texture information comprises:
generating the face texture mapping according to the to-be-rendered texture information; and
performing rendering on the second three-dimensional human face model based on the face texture mapping.

13. The method according to claim 9, before acquiring the first video, further comprising:
acquiring an original three-dimensional human face model and unrenderable part information, wherein the unrenderable part information is information of an unrenderable part in the original three-dimensional human face model;
deleting a patch corresponding to the unrenderable part in the original three-dimensional human face model according to the unrenderable part information to obtain a target three-dimensional human face model; and
using the target three-dimensional human face model as a first three-dimensional human face model corresponding to a first video frame in the first video.

14. The method according to claim 1, wherein performing the mapping rendering on the second three-dimensional human face model according to the to-be-rendered texture information comprises:
generating the face texture mapping according to the to-be-rendered texture information; and
performing rendering on the second three-dimensional human face model based on the face texture mapping.

15. The method according to claim 1, before acquiring the first video, further comprising:
acquiring an original three-dimensional human face model and unrenderable part information, wherein the unrenderable part information is information of an unrenderable part in the original three-dimensional human face model;
deleting a patch corresponding to the unrenderable part in the original three-dimensional human face model according to the unrenderable part information to obtain a target three-dimensional human face model; and
using the target three-dimensional human face model as a first three-dimensional human face model corresponding to a first video frame in the first video.

16. An electronic device, comprising:
one or more processors; and
a memory configured to store one or more programs;
wherein the one or more programs, when executed by the one or more processors, cause the one or more processors to implement the following steps:
acquiring a first video, and recognizing at least one first face key point of a first target object in the first video, wherein the at least one first face key point corresponds to at least one mask key point in a three-dimensional human face mask effect; and
adding the three-dimensional human face mask effect to video frames of the first video to obtain a second video, wherein the at least one mask key point in the three-dimensional human face mask effect moves with a corresponding first face key point;
wherein adding the three-dimensional human face mask effect to the video frames of the first video comprises:
determining first position data of the at least one first face key point in a current first video frame in the first video, and acquiring a first three-dimensional human face model corresponding to the current first video frame;
updating a position of each patch vertex in the first three-dimensional human face model according to the first position data to obtain a second three-dimensional human face model corresponding to the current first video frame;
performing mapping rendering on the second three-dimensional human face model to obtain a current three-dimensional human face mask effect; and
adding the current three-dimensional human face mask effect to the current first video frame to obtain a current second video frame; and
acquiring to-be-rendered texture information of the second three-dimensional human face model, comprising:
determining a to-be-rendered material corresponding to the current first video frame, and acquiring texture information of the to-be-rendered material as the to-be-rendered texture information of the second three-dimensional human face model.

17. A non-transitory computer-readable storage medium storing a computer program which, when executed by a processor, implements the following steps:
acquiring a first video, and recognizing at least one first face key point of a first target object in the first video, wherein the at least one first face key point corresponds to at least one mask key point in a three-dimensional human face mask effect; and
adding the three-dimensional human face mask effect to video frames of the first video to obtain a second video, wherein the at least one mask key point in the three-dimensional human face mask effect moves with a corresponding first face key point;
wherein adding the three-dimensional human face mask effect to the video frames of the first video comprises:
determining first position data of the at least one first face key point in a current first video frame in the first video, and acquiring a first three-dimensional human face model corresponding to the current first video frame;

updating a position of each patch vertex in the first three-dimensional human face model according to the first position data to obtain a second three-dimensional human face model corresponding to the current first video frame;

performing mapping rendering on the second three-dimensional human face model to obtain a current three-dimensional human face mask effect; and adding the current three-dimensional human face mask effect to the current first video frame to obtain a current second video frame; and acquiring to-be-rendered texture information of the second three-dimensional human face model, comprising:
determining a to-be-rendered material corresponding to the current first video frame, and acquiring texture information of the to-be-rendered material as the to-be-rendered texture information of the second three-dimensional human face model.

* * * * *